(12) United States Patent
Hauck et al.

(10) Patent No.: US 8,525,051 B2
(45) Date of Patent: Sep. 3, 2013

(54) SEALING MECHANISM

(75) Inventors: Timo Hauck, Kaiserslautern (DE);
Bernd Zinke, Mandelbachtal (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 801 days.

(21) Appl. No.: 12/726,544

(22) Filed: Mar. 18, 2010

(65) Prior Publication Data

US 2010/0236842 A1    Sep. 23, 2010

(30) Foreign Application Priority Data

Mar. 19, 2009   (DE) .................. 10 2009 013 545

(51) Int. Cl.
*G01G 23/02*   (2006.01)
*G01G 21/30*   (2006.01)

(52) U.S. Cl.
USPC .... 177/124; 177/243; 177/262; 177/210 EM; 277/628

(58) Field of Classification Search
USPC .................. 177/238–243; 277/628
See application file for complete search history.

(56) References Cited

U.S. PATENT DOCUMENTS

| 3,444,943 | A | * | 5/1969 | Tytus | 177/180 |
| 3,982,738 | A | * | 9/1976 | Meier et al. | 267/121 |
| 4,846,293 | A | * | 7/1989 | Li | 177/210 C |
| 6,600,112 | B2 | * | 7/2003 | Iseli | 177/154 |
| 6,923,449 | B2 | * | 8/2005 | Burkhard et al. | 277/412 |
| 7,112,750 | B2 | * | 9/2006 | Emery et al. | 177/180 |
| 7,411,137 | B2 | * | 8/2008 | Sandberg et al. | 177/154 |
| 7,834,279 | B2 | * | 11/2010 | Macmichael | 177/238 |
| 2001/0027882 | A1 | * | 10/2001 | Iseli | 177/145 |
| 2008/0041637 | A1 | * | 2/2008 | Macmichael | 177/145 |

FOREIGN PATENT DOCUMENTS

| JP | 44-027916 Y1 | 11/1969 |
| JP | 47-024167 U | 11/1972 |
| JP | 11-258032 A | 9/1999 |
| WO | 2007050145 A2 | 5/2007 |

OTHER PUBLICATIONS

JPO, Notice of Rejection issued Nov. 15, 2011 in corresponding Japanese Patent Application No. 2010-063733 (4 pages).

* cited by examiner

*Primary Examiner* — Leonard Chang
*Assistant Examiner* — Natalie Huls
(74) *Attorney, Agent, or Firm* — The Culbertson Group, P.C.

(57) ABSTRACT

The invention relates to a sealing mechanism for a scale, in which a connection element connected to a moving lifting element seals or opens an annular gap, wherein, for an opened annular gap, the connection element and lifting element form a biasing load for the weighing sensor of the scale.

20 Claims, 1 Drawing Sheet

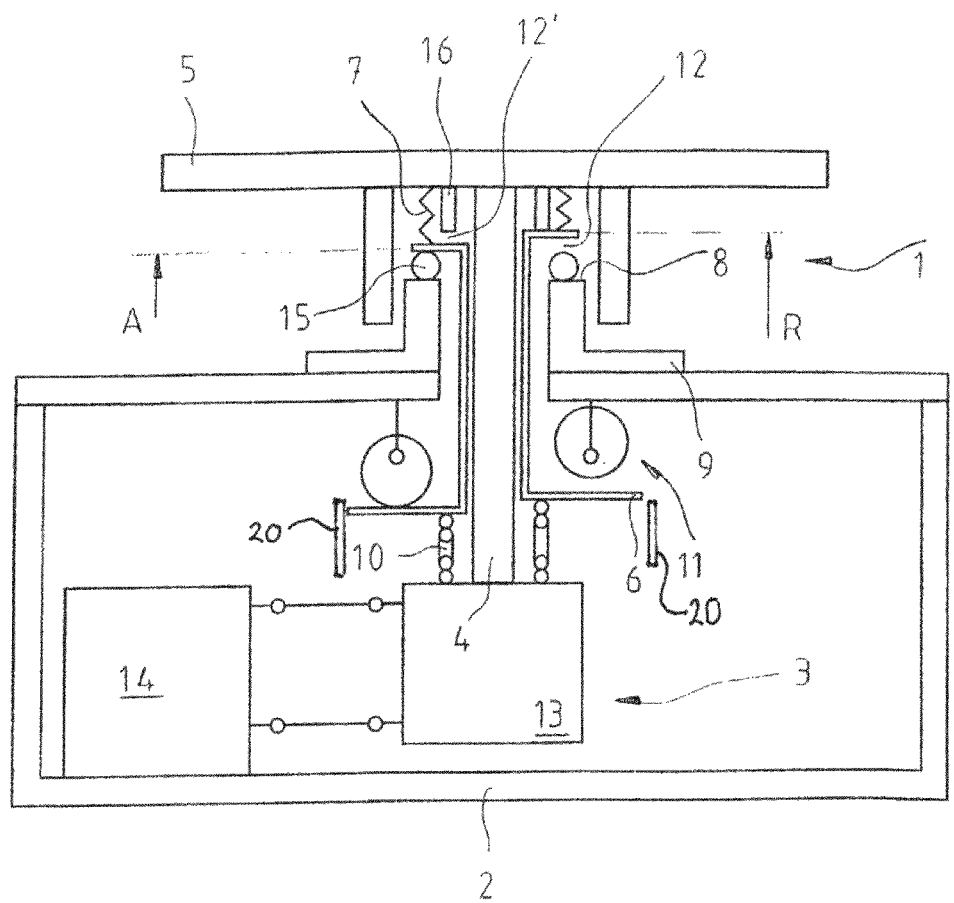

SEALING MECHANISM

FIELD OF THE INVENTION

The present invention relates to a sealing mechanism for a scale.

BACKGROUND

From the state of the art (EP 11 46 322 B1), seals for scales are known. These are used for the temporary sealing of the scale housing, usually for the purpose of cleaning. Here, a seal that is, for example, inflatable, is activated between a load receiver projecting out from the scale housing and the housing itself, so that the (annular) gap is closed between the load receiver and housing, in order to prevent the penetration of cleaning agent. In the deactivated state, the seal releases the load receiver, so that this can forward a weight force introduced into it without force shunts to a weighing sensor that is arranged in the housing and that has, e.g., a strain gauge or that operates according to the principle of electromagnetic force compensation. The charging of the seal with the medium to be fed (e.g., compressed air) is structurally complicated and expensive.

From WO 2007/050145 a seal for a scale is known in which a sealing element that can be moved relative to the scale housing can be moved under spring loading against a flange arranged on the upper end of the load receiver. Through contact with this flange, the annular gap between the load receiver and housing is sealed against the surroundings. For opening the seal, the moving element is lowered by pressure loading against the spring force, wherein the load receiver is released for supporting its weighing function.

Disadvantageously, for this seal, the load receiver is loaded with a spring force that is (considerable under some circumstances) introduced directly into the weighing sensor. The corresponding mechanism is loaded accordingly, which can also lead to overloading of individual components or regions of the weighing sensor or the scale. Undesired creep effects could be the result. Also, an electromagnetic compensation of this force introduced into the sensor could be undesired and could require, under some circumstances, high compensation currents.

In particular, the sealing effect depends on the contact pressure of the sealing surfaces against each other, so that a high sealing effect necessarily accompanies a high loading of the weighing sensor or the scale mechanism.

SUMMARY OF THE INVENTION

The present invention is therefore to provide a sealing mechanism for the reliable sealing of a scale housing in which the previously mentioned disadvantages are eliminated. This is achieved by an innovative sealing mechanism.

The invention is based on the knowledge that a sealing effect protecting a weighing sensor particularly well can be generated with the help of a lifting element. In one operating position, this interacts with the housing to form a seal, while it is connected only to the load receiver in a non-sealing rest position. This produces the advantage that a contact force for achieving the sealing effect can exist between the lifting element and a component of the housing, without this contact force simultaneously acting on the weighing sensor or the mechanism.

The annular gap that is to be sealed and that typically surrounds the load receiver is advantageously closed by a connection element that advantageously has a flexible construction. This connection element is connected with one end permanently (but optionally also detachably) to the load receiver or a load element sitting on this receiver. According to one variant, the second end of the connection element can likewise be connected permanently (but optionally likewise detachably) to the lifting element, and, indeed, in direct or also indirect frictional connection.

If the lifting element moves upward, for example, in the vertical direction at the upper end of the load receiver toward or from below in the direction of the plate-shaped load element, then the two ends of the connection element are moved toward each other and an annular gap between the connection element and the housing is created. Preferably, the lifting element is connected in this case exclusively to the load element and acts as a pre-load on the weighing sensor. In this state, the scale is ready for operation.

In contrast, if the lifting element moves downward in the opposite direction, then the flexible connection element elongates downward in the vertical direction until a section of the lifting element interacts with a sealing surface that is constructed on the housing or a component connected to this housing. The annular gap is thus closed and the scale interior is sealed from the surroundings.

A different variant provides that the connection element is not connected permanently with its second (advantageously lower) end to the lifting element. Instead, on its path into the working position, the lifting element can also first contact this second end of the connection element and can move or pull down together with it. In the opposite direction of motion of the lifting element, that is, on the path from the working position into the rest position, the contact between the lifting element and the connection element could be detached again, while the lifting element is pressed by suitable means into the rest position. Thus, at the lower end of the connection means, e.g., a laterally projecting, flange-like apron could be formed that is contacted or loaded by the lifting element on its path into the working position, and, indeed, advantageously across the entire periphery. Such a construction advantageously simplifies the assembly and maintenance of the sealing system.

The contact force with which the lifting element acts on the sealing surface on the housing can be selected largely arbitrarily according to the invention. This force acting between the sealing surfaces remains without acting on the weighing sensor. In the closed (working) position of the lifting element, this sensor is loaded merely with the tensile force internal to the connection element, when it is elongated away from the load element or the load receiver or from its relaxed position for contact of the lifting element on the sealing surface. This biasing force can be selected to be very low. In contrast, the lifting element itself rests in the working position on the housing and thus does not load the weighing sensor.

(Typically, the load receiver extends in the vertical direction upward from the scale housing and on its free end there is a load element for supporting the goods to be weighed. The descriptions above have been oriented to this variant. Nevertheless, the load receiver could also project downward in the opposite direction or even laterally from the housing. The structural configuration of the invention is to be adapted accordingly, and is not limited to one special variant.)

One core concept of the invention is to connect the lifting element to the load element or to the load receiver at least in the rest position. In contrast to the state of the art, the lifting element that represents a component of the sealing mechanism that can move relative to the load receiver is nevertheless also to be considered with respect to the measurement as a biasing load during the normal weighing operation. According to the invention, however, the sealing force required for achieving the sealing can be selected largely arbitrarily independent of a connection of the lifting element on the weighing sensor, without loading the sensor too much in the previously described, disadvantageous way.

A suitable activation mechanism that releases the lifting element in the rest position (seal opened, scale ready for use) can move the lifting element for achieving the sealing effect with a suitable load force for the purpose of forming a seal in a working position (seal closed, scale not ready for use).

As already stated, the housing-side sealing surface could be formed directly on the housing or on a component advantageously connected rigidly to the housing. In continuation of this idea, such a component could be part of a labyrinth seal. For example, an annular element that surrounds the load receiver and that is arranged around the housing opening on the scale housing could be part of a labyrinth seal. The vertical end face directed upward on this annular element could also be the sealing surface that loads the lifting element into its working position with a sealing force. A suitable sealing means (O-ring or the like) could be arranged in the end face of the annular element facing upward or also in the region of the opposite sealing surface of the lifting element. Sealing surfaces that lie one on top of the other directly are also conceivable.

For example, for a connection element partially surrounding the lifting element, this could also form a sealing surface (instead of the lifting element). This would then be the case, for example, if a bellows surrounded, with its lower end, an upper flange on the lifting element or was even bonded with the flange bottom side. Then, in the working position, the side of the lower end of the bellows facing downward would come to lie on the housing-fixed sealing surface. The permanent or detachable coupling of the lifting element or connection element with an active element that has, on its side, the sealing surface interacting with the housing-fixed sealing surface is also conceivable.

One advantageous embodiment of the invention provides that the connection element is configured in the form of a seal membrane. This should also be understood to include bellows or an element operating functionally in the same way. According to the invention, this element should be arranged with a first end permanently on the load element or on the load receiver. A second end of the seal membrane opposite the first end should here be able to move flexibly relative to the first end. According to the invention it is coupled or can be coupled with the lifting element, in order to at least partially follow its movements from the rest position into the operating position and back. Through these movements, the seal membrane is expanded or fanned out or compressed or pushed together. In this way, the annular gap to be sealed could be covered or opened, wherein, according to the construction, this movement guides the lift element, the seal membrane, or both across the gap to be sealed, in order to cover or open it. The seal membrane can have a very lightweight construction, as long as it reliably seals the covered annular gap across the entire height, especially in the elongated or fanned-out state.

For preventing incorrect measurement results, in the rest position the lifting element is attached to the load element or the load receiver as a biasing load without force shunts. In this way, the lifting element (just like the flexible connection element) is also weighed in the weighing operation, it "hangs" somewhat freely on the load receiver or load element.

A connection element constructed, e.g., as bellows, further allows the compensation of a possible slanted position between the housing-side sealing surface and the associated sealing surface of the lifting element in the working position. Due to the flexibility, such a slanted position can be easily compensated, so that the lifting element can adapt in its working position to the actual spatial position of the housing-side sealing surface. The second (lower) end of the flexible connection element is connected to the lifting element at least in the working position and likewise can be adapted to the slanted position.

One advantageous refinement of the invention provides that the lifting element is loaded by a biasing force that moves the lifting element into the rest position. This means that the lifting element always tries to reach the position in which the seal is opened and the scale is ready for use. This biasing force can be applied, according to the invention, by a pulling or pressing spring element or another element with the same action that is supported on the load receiver or a part connected to this receiver. For example, a spiral spring that is arranged around the load receiver and that loads the lifting element from below with the spring force is conceivable. The lifting element is here forced upward in the direction toward a load element arranged on the end of the load receiver. If the connection element is connected on its second end permanently to the lifting element, then the connection element is pressed together and the upward movement of the lifting element or connection element opens the annular gap.

Preferably, the spring element also forms a biasing load on the weighing sensor, that is, in the normal weighing operation, it is taken into account with respect to the measurement. Through the biased position of the lifting element, its rest position is defined. With the help of an activation mechanism still to be described below, the lifting element is moved from this rest position into the working position.

Instead of or in addition to a separate spring element, the biasing force could also be generated by the connection element itself. For example, this could be constructed as a bellows with a tension spring property, wherein the second (lower) end is connected permanently to the lifting element. In this case, the bellows always tries to reach its compressed or pushed-together position, wherein the lifting element arranged on the free (lower) end of the bellows is likewise lifted, so that the annular gap is opened. The spring force internal to the connection element is preferably selected so that it is just sufficient for keeping the lifting element in the rest position. If the lifting element moves against the spring force into the working position, then the low tension force generated in the connection element acts on the weighing sensor or its mechanism.

According to one advantageous embodiment of the invention, it is provided that the lifting element can be charged by means of an activation mechanism arranged inside or outside the housing with an activation force. The activation force preferably acts in the direction of the working position. The activation mechanism can here be constructed so that, after the lifting element has reached the working position, it generates a specified contact force in order to press the lifting element onto the housing-side sealing surface and, in this way, to achieve the desired sealing effect. According to the invention, this contact force does not load the weighing sensor. One simple embodiment of the activation mechanism comprises a cam plate or a cam that interacts with the lifting element when rotating about its axis, in order to move this lifting element. Alternative embodiments comprise manual activation just like a pneumatic, electromechanical, piezoelectric, or other mechanism with the same function and common for someone skilled in the art. A drive with an adjustment screw or a spindle-like mechanism is also conceivable. In order to guarantee that the lifting element is coupled in its rest position without force shunts on the load receiver, the activation mechanism is constructed so that it does not contact the lifting element in its rest position.

Another advantageous embodiment of the invention provides that the load receiver is used as a guide for moving the lifting element. In this way it is guaranteed that the lifting element exactly assumes the working position required for the sealing in the scope of the specified tolerances. Alternatively or additionally, the lifting element could also interact with a housing-fixed guide for guiding its movements, such as, for example, the depicted guide 20 in the Figure. In this way, it is to be taken into account that this guide mechanism should produce its effect only after the lifting element has left its rest position, thus, the scale should not be operated temporarily. In this case, the force shunt produced between the housing-side guide and the lifting element is insignificant.

Another embodiment has a profiled sealing surface of the lifting element that also interacts with positive-fit locking with a complementary constructed, housing-fixed sealing surface. In this way—in addition to an improved sealing effect—a centering or guiding of the lifting element relative to the housing could also be achieved.

Above, the seal was mainly provided for the purpose of temporarily closing the usually gap-like opening to the interior of the scale housing and thus to prevent the penetration of cleaning medium or other substances. Another embodiment also provides to construct the seal as an anti-explosion device that is automatically activated, e.g., as soon as a gas warning device is triggered. The seal can thus also be provided for achieving a specified minimum sealing effect.

Furthermore, in one variant the sealing mechanism is constructed or used as overload protection and simultaneously or alternatively as transportation protection, so that the seal is used not only temporarily (e.g., for cleaning purposes), but also for longer time periods (hours, days).

BRIEF DESCRIPTION OF THE DRAWINGS

The single FIGURE shows, in a schematic sectional diagram, a scale with the sealing mechanism 1 according to the invention.

DETAILED DESCRIPTION OF PREFERRED EMBODIMENTS

The single FIGURE shows a weighing sensor 3 is arranged in a housing 2. According to this embodiment, the sensor 3 comprises a stationary section 14 and a section 13 that can move vertically relative to the stationary section, wherein the moving section 13 is coupled with a load receiver 4. The rod-shaped load receiver 4 extends upward in the vertical direction through the housing 2 and is loaded by a load element 5 on the outside of the housing 2. A weight applied to the load element 5 loads the moving section 13 of the weighing sensor by means of the load receiver 4 downward in the vertical direction. A not-shown, advantageously electromagnetic force-compensation mechanism compensates this force in the normal weighing operation with an adjustable counter force that is used for determining the weight.

The load receiver 4 is surrounded by a lifting element 6. The lifting element 6 has an essentially tubular form and has, on each of its two ends, a flange-like extension. According to the invention, the lifting element 6 can move between two positions. In a working position A, the upper flange contacts sealing means 15 that are constructed as an O-ring and that are pressed against the upper end face 8 of a sealing component 9.

In contrast, in a rest position R, the lifting element 6 opens an annular gap 12 between its upper flange and the sealing element 15.

(For better understanding, both positions of the lifting element 6 are shown together in the single FIGURE.) The section shown in the single FIGURE at the left of load receiver 4 shows the lifting element 6 in the lowered working position A. The section at the right of the load receiver 4 shows the lifting element 6 in its raised rest position R.

The lifting element 6 is connected to the load element 5 by means of a connection element 7. The connection element 7 is constructed as a bellows and can expand or compress in the vertical direction. While the upper end of the connection element 7 is connected to the load element 5, the opposite lower end of the connection element 7 follows the vertical movements of the lifting element 6 from the rest position R into the working position A and back.

In the working position A, the connection element 7 is fanned out or expanded downward until the upper flange of the lifting element 6 interacts with the sealing means 15. In this case, the scale interior is reliably protected against penetration of medium (e.g., dust, cleaning agents, gases, etc.) from the outside, because, in its fanned-out position, the connection element 7 covers the annular gap 12 together with the lifting element 6.

While the lifting element 6 closes the initial gap 12 to be sealed, the flexible connection element 7 covers or seals the gap 12' found above its flange due to the downward movement of the rigidly constructed lifting element 6.

In contrast, in the rest position R, the lifting element 6 is lifted so far until it impacts against a (not absolutely necessary) stop 16 with its upper flange. The connection element 7 is compressed here and opens the annular gap 12. In this state, the scale is ready for use, but the scale interior is not sealed from undesired penetration of medium from an open annular gap.

As can be seen from the single FIGURE, the lifting element 6 is coupled in its rest position R without force shunts with the load element 5 or the load receiver 4. It then rests on the moving section 13 of the weighing sensor as a biasing load that is also weighed. A spring element 10 similarly arranged on the element 13 loads the lower flange of the lifting element 6 from below, by means of which the lifting element 6 assumes its rest position R on the stop 16, as long as it is not actively forced from this position. The lifting element 6 here similarly forms a biasing load like the spring element 10, the stop 16, and the connection element 7. At the same time, the lifting element 6 is constructed so that it does not connect stationary components of the housing of the scale when the rest position R is reached, so that a force shunt is avoided.

An activation mechanism 11 arranged within the scale housing 2 is used to pull the lifting element 6 against the spring force of the spring element 10 from the rest position R into the working position A. For this purpose, the activation mechanism 11 uses a cam. For rotation about its eccentric axis, this moves into contact with the top side of the lower flange of the lifting element 6. For further pivoting of the cam, the lower flange and thus the entire lifting element 6 is pressed out in the vertical direction. In this way, it detaches from the upper stop 16 and expands the connection element 7 together with its movement until finally the working position A is reached.

In the working position A, the lifting element 6 presses on a sealing element 15 that interacts, on its side, with the upper end face 8 of a labyrinth seal 9. All of the forces (weight or contact forces) that are transmitted via the seal into the scale housing are then advantageously decoupled from the load receiver 4 of the weighing sensor 3.

The activation mechanism 11 can advantageously be designed so that the lifting element 6 presses with a specified sealing force on the sealing element 15 or the sealing surface 8, in order to guarantee the sealing of the scale interior. Although the lifting element 6 coupled with the load receiver 4 in the working position A can also be provided with a high vertical sealing force, in this way only the force produced from the compression of the spring element 10 and the elongation of the connection element 7 is transmitted onto the weighing sensor 3 (plus the components permanently included in the biasing load), because the lifting element itself rests in the working position A on the housing or the component 9.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A sealing mechanism for a scale in which, in a housing there is a weighing sensor that can be loaded with a weight force to be measured by means of a rod-shaped load receiver projecting outward through a housing opening, wherein the rod-shaped load receiver carries, on its free end, a plate-shaped load element for supporting goods to be weighed, the sealing mechanism comprising:
   a) a lifting element that can move relative to the rod-shaped load receiver and that can be moved between a working position in which the lifting element forms a seal of the housing opening and a rest position in which the housing opening is not sealed;
   b) wherein the lifting element is connected to the load element or to the load receiver as a biasing load in the rest position.

2. The sealing mechanism of claim 1, wherein the lifting element loads a connection element in the working position, in order to close a housing gap in this way.

3. The sealing mechanism of claim 1, wherein the lifting element is connected by means of a flexible connection element to the plate-shaped load element or to the rod-shaped load receiver.

4. The sealing mechanism of claim 1, wherein a surface of the lifting element, or a connection element, or an active element coupled with the lifting element or the connection element interacts with a sealing surface indirectly or directly in the working position, wherein the sealing surface is constructed on the housing or on a component connected rigidly to the housing.

5. The sealing mechanism of claim 1, wherein a connection element is constructed in the form of a sealing membrane that is connected with a first end on the plate-shaped load element and on an opposite second membrane end to the lifting element in order to follow, with the second end, the movements of the lifting element at least in the direction of the working position.

6. The sealing mechanism of claim 1, wherein the lifting element is loaded by a biasing force that forces the lifting element into the rest position or into the working position.

7. The sealing mechanism of claim 6, wherein the biasing force is applied by a spring element that is supported on the rod-shaped load receiver or a part connected to this rod-shaped load receiver.

8. The sealing mechanism of claim 6, wherein the biasing force is generated by a connection element with a flexible construction.

9. The sealing mechanism of claim 1, wherein the lifting element can be loaded with an activation force that forces the lifting element into the working position by means of an activation mechanism arranged inside or outside the housing.

10. The sealing mechanism of claim 1, wherein a connection element or the lifting element closes an annular gap between the housing or a component connected to the housing and the plate-shaped load element or the rod-shaped load receiver when the lifting element is moved from the rest position into the working position.

11. The sealing mechanism of claim 1, wherein the load receiver is used as a guide for the movements of the lifting element.

12. The sealing mechanism of claim 1, wherein the lifting element interacts with a guide fixed on the housing for guiding its movements after it has left the rest position.

13. The sealing mechanism of claim 1, wherein a connection element is constructed in the form of a sealing membrane that is connected with a first end on the plate-shaped load element and on an opposite second membrane end adapted to be loaded by the lifting element, in order to follow, with the second end, the movements of the lifting element at least in the direction of the working position.

14. The sealing mechanism of claim 1, wherein a connection element is constructed in the form of a sealing membrane that is connected with a first end on the rod-shaped load receiver and on an opposite second membrane end to the lifting element, in order to follow, with the second end, the movements of the lifting element at least in the direction of the working position.

15. The sealing mechanism of claim 1, wherein a connection element is constructed in the form of a sealing membrane that is connected with a first end on the rod-shaped load receiver and on an opposite second membrane end adapted to be loaded by the lifting element, in order to follow, with the second end, the movements of the lifting element at least in the direction of the working position.

16. The sealing mechanism of claim 1, further wherein:
   (a) the lifting element comprises a tubular form extending through the housing opening; and
   (b) the rod-shaped load receiver passes through the tubular form of the lifting element.

17. The sealing mechanism of claim 16, wherein the lifting element has a flange-like extension on an upper end, the flange like extension adapted to press against an upper flange contact seal constructed as an O-ring in the working position.

18. The sealing mechanism of claim 17, in which the upper flange contact seal is pressed against an upper end face of a sealing component when the lifting element is in the working position.

19. The sealing mechanism of claim 17, wherein the lifting element has a second flange-like extension on a lower end connecting to the weighing sensor by a spring element located beneath the second flange-like extension and above the weighing sensor.

20. A scale comprising:
   a housing holding a weighing sensor that can be loaded with a weight force to be measured by means of a rod-shaped load receiver projecting outward through a housing opening, wherein the rod-shaped load receiver carries, on an upper end, a plate-shaped load element for supporting goods to be weighed, a sealing mechanism comprising:

(a) a lifting element including a tubular form extending through the housing opening and through which the rod-shaped load receiver passes, and an upper flange,
  (i) the lifting element adapted to be moved relative to the rod-shaped load receiver;
  (ii) the lifting element adapted to be moved relative to the housing;
  (iii) the lifting element adapted to be moved between a working position, in which the lifting element upper flange presses downward toward the housing to create a seal of the housing opening from above the housing, and a rest position in which the housing opening is not sealed; and
  (iv) wherein the lifting element is connected to the load element or to the load receiver as a biasing load in the rest position; and (b) an annular sealing element constructed as an O-ring positioned between the lifting element upper flange and the housing, the annular sealing element adapted to be compressed downward beneath the lifting element upper flange to create the seal in the working position.

* * * * *